Figure 1:
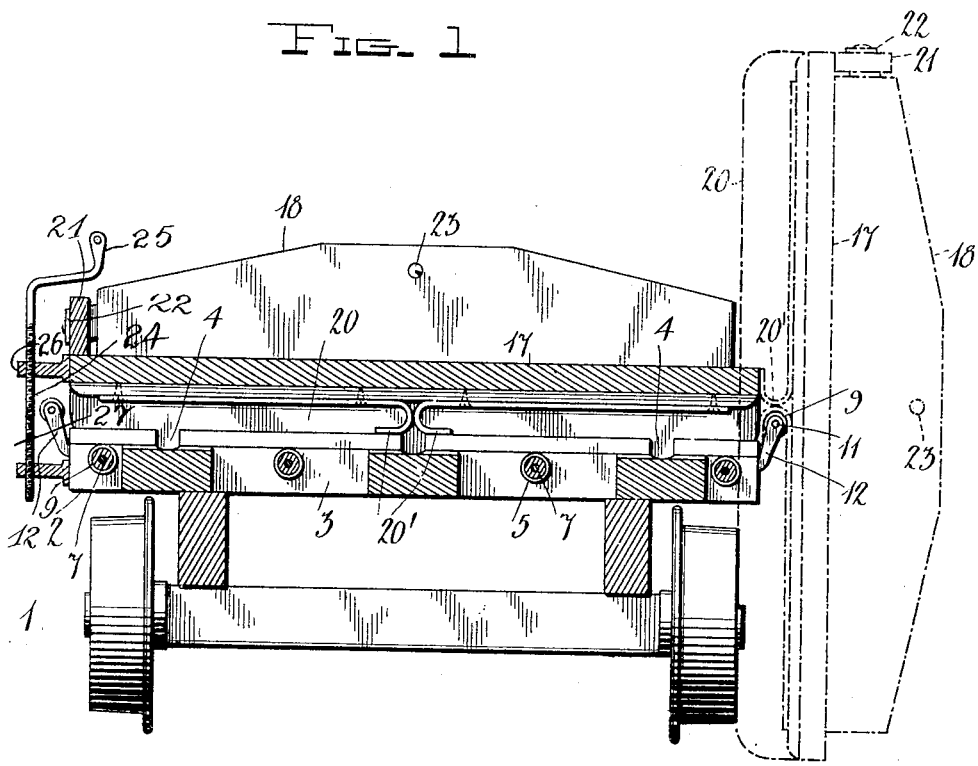

No. 805,643. PATENTED NOV. 28, 1905.
B. GILLERAN.
DUMPING CAR.
APPLICATION FILED MAY 18, 1905.

2 SHEETS—SHEET 1.

Witnesses
I. Jenkins
C. H. Griesbauer.

Inventor
Bernard Gilleran
by H. B. Willson
Attorney

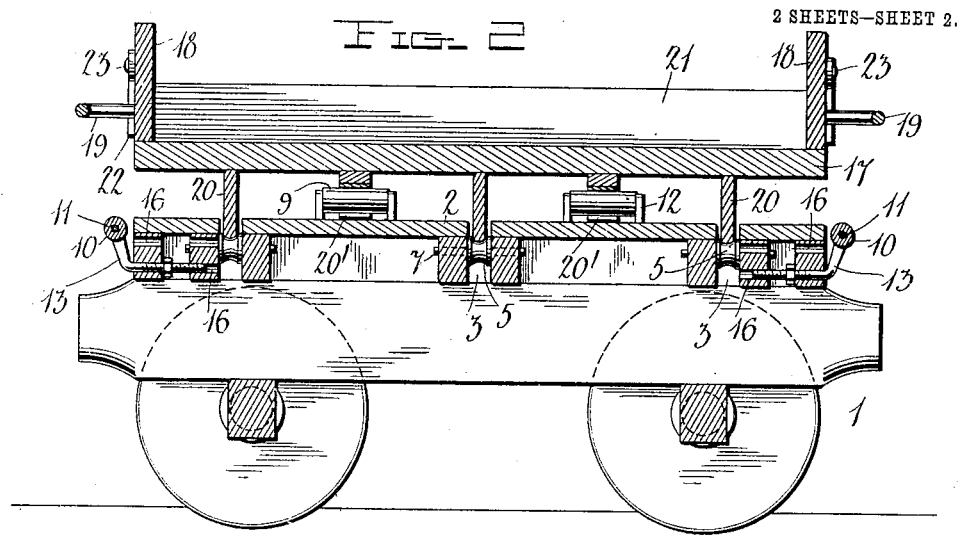
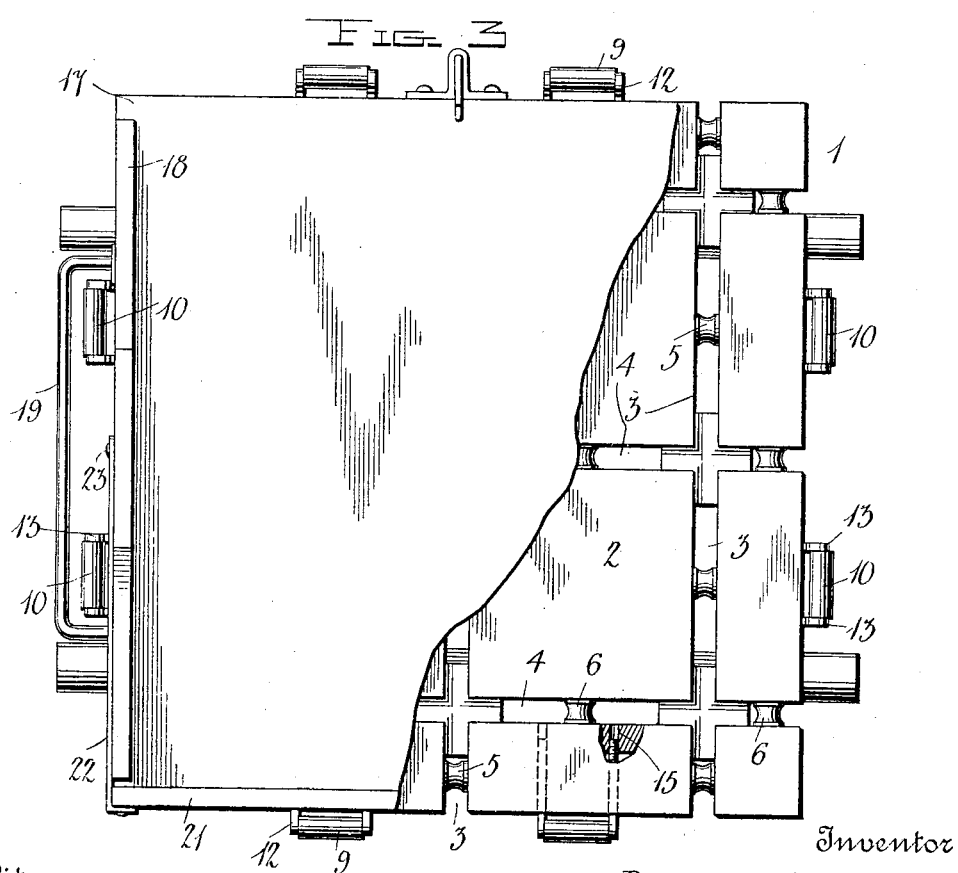

UNITED STATES PATENT OFFICE.

BERNARD GILLERAN, OF HANCOCK, MICHIGAN, ASSIGNOR OF ONE-HALF TO RICHARD T. LOONEY, OF HANCOCK, MICHIGAN.

DUMPING-CAR.

No. 805,643.   Specification of Letters Patent.   Patented Nov. 28, 1905.

Application filed May 18, 1905. Serial No. 261,048.

*To all whom it may concern:*

Be it known that I, BERNARD GILLERAN, a citizen of the United States, residing at Hancock, in the county of Houghton and State of Michigan, have invented certain new and useful Improvements in Dumping-Cars; and I do declare the following to be a full, clear, and exact description of the invention, such as will enable others skilled in the art to which it appertains to make and use the same.

My invention relates to improvements in dumping-cars; and it consists in the construction, combination, and arrangement of devices hereinafter described and claimed.

The object of the invention is to provide a dumping-bed attachment for a push-car or other vehicle by means of which a load of material—such as sand, gravel, earth, or stone—may be readily discharged from the car and which dumping-bed may be readily detached from the car when it is not required for use thereon.

In the accompanying drawings, Figure 1 is a transverse sectional view of a dumping-car embodying my improvements, the dumping-bed being shown in full lines in position on the car for transporting the load and in dotted lines in the position required for dumping the load. Fig. 2 is a longitudinal sectional view of the car and the dumping-bed attachment thereon; and Fig. 3 is a top plan view, a portion of the dumping-bed attachment being broken away to show the construction of the car-platform.

The car 1 here shown is a push-car, such as is adapted for use by section-hands on a railroad. Within the scope of my invention the car may be of any suitable size or kind and may be of any suitable construction. The platform 2 of the car is so constructed as to provide it with transverse grooves 3 and longitudinal grooves 4. Vertical openings in the platform of the car communicate with the said grooves, respectively. As here shown, there are three of the transverse grooves and a corresponding number of the longitudinal grooves, and the said grooves are equidistant. In the openings which communicate with the transverse grooves are peripherally-grooved rollers 5. Similar rollers 6 are in the openings which communicate with the longitudinal grooves. The said rollers 5 and 6 may be mounted by any suitable means. For the purposes of this specification they are shown as mounted on removable rods 7, which run through the frame of the platform. At the sides and ends of the car are rollers 9 10, which are cylindrical in form, of suitable length and diameter, and are here shown as mounted on rods 11, which are carried by and are detachable from pairs of arms 12 13. The said arms have their inner portions straight and mounted in openings 15 16, respectively, in the sides and ends of the car-platform and have their outer portions at substantially right angles to their inner portions. The said arms when the rods on which the rollers are mounted have been removed therefrom may be turned so as to cause the rollers when they are remounted to be disposed either below the platform or to extend above it, as shown. When the said rollers are below the platform, they serve as handles, which may be grasped in order to push the car or to lift it from the track. The openings 15 16, in which the pivotal portions of the car are mounted, are arranged in vertical series in the sides and ends of the car, so that the said arms and the rollers which they carry may be raised and lowered. When the said arms are in the lower openings and their outer portions are upturned, they dispose the rollers so that their upper sides are slightly above the upper sides of the car-platform, and the said rollers when thus disposed greatly facilitate the loading and unloading of lumber and the like material, as will be readily understood. The arms are mounted in the upper openings and upturned with respect to their outer end portions in order to dispose the rollers on either side or end of the car above the car-platform to coact with the hinge devices with which the dumping-bed is provided in order to enable the dumping-bed when moved laterally or longitudinally from the car to be hingedly connected thereto while being dumped and restored to its horizontal position before being again moved over and upon the car.

I will now describe my improved dumping-bed attachment. The same is here shown as a platform 17, provided on its upper side with end-boards 18. Handle-bars 19 are secured to and are disposed on the outer sides of the said end-boards. On the under side of the platform 17 of the dumping-bed attachment are runners 20, which are adapted to engage either the transverse grooves 3 or the longitudinal grooves 4 of the car-platform, according to whether it is desired to dump the load from the side or from the end of the car. The said runners bear on the peripherally-grooved rollers with which the car-platform is provided, said rollers coacting with the said runners to reduce friction between the dumping-bed and the car to enable the dumping-bed to be moved either transversely or longitudinally of the car. Under the bottom of the dumping-bed are secured reversely-directed hinge-hooks 20'. The rollers at one end or side of the car having been properly set, so as to be disposed above the same, and the dumping-bed having been placed on the car for appropriate movement thereon, said bed when it is moved from the car causes two of its hinge-hooks 20' to come near the center of the bed to engage the said rollers and to coact therewith to form hinge connections, which facilitate the dumping of the bed, prevent the bed from becoming entirely disconnected from the car, and also enable the bed when it has been discharged of its load to be readily returned to a horizontal position for remounting on the car.

I also provide the dumping-bed with a shiftable side-board 21, which may be shifted to either side of the car and is pivotally connected to the end-board 18 by means of link-arms 22 and pivots 23, the latter being in line with the longitudinal center of the car, so that the shiftable side-board may be shifted to either side of the car, according to the direction in which the load is to be discharged therefrom. It will be seen that the hinge-hooks of the dumping-bed attachment become entirely disconnected from the coacting hinge devices at the sides and ends of the car when the dumping-bed attachment is in a horizontal position and is mounted entirely on the car, and hence the dumping-bed attachment may be readily detached from the car by lifting it therefrom by means of the handle-bars 19. Hence my improved car may be used either with or without the dumping-bed attachment, as may be desired.

In order to prevent the dumping-bed from moving on the car when the latter is in motion, I provide means to lock the dumping-bed attachment on the car. Any suitable means may, within the scope of my invention, be employed for this purpose. For the purposes of this specification I show a screw-threaded pin 24, having a crank 25 at its upper end, whereby it may be readily revolved, and keepers 26 27, which are respectively secured to the bed and to the car and which may be engaged and disengaged by the said screw-threaded pin. Said keepers may be either of the form here shown or they may be of any other suitable construction, and the same is true also of the pin.

Having thus described my invention, what I claim as new, and desire to secure by Letters Patent, is—

1. A car having a keeper at one side, in combination with a dumping-bed slidable thereon and having a keeper at one side, coacting means with which the bed and car are provided to hingedly connect the bed to the car when the bed is in position to dump its contents, and a screw-pin to engage threaded openings in and detachably connect the keepers to secure the bed against movement on the car.

2. In combination with a car having vertically-adjustable devices at the sides and ends thereof, a dumping-bed movable longitudinally and laterally on the car and having devices to coact with those of the car to hingedly connect the bed to the car when the bed is in dumping position.

3. A car having vertically-adjustable rollers at one side or end thereof, in combination with bed adapted to be slidably mounted on the car, and having devices to coact with said rollers when the latter are in elevated position, to hingedly connect said bed to the car to facilitate the dumping of the bed and to prevent its slipping from the car when in dumping position.

4. A car having a dumping-bed, the latter being open at opposite sides and provided with a single shiftable side-board pivotally connected thereto and capable of operating on either side of the car to close either side thereof.

In testimony whereof I have hereunto set my hand in presence of two subscribing witnesses.

BERNARD GILLERAN.

Witnesses:
   JAMES D. LOONEY,
   ST. CLAIR WILLSON.